July 15, 1947.　　　A. WARNICK　　　2,424,131
REACTIVE CURRENT INDICATOR
Filed Feb. 4, 1946
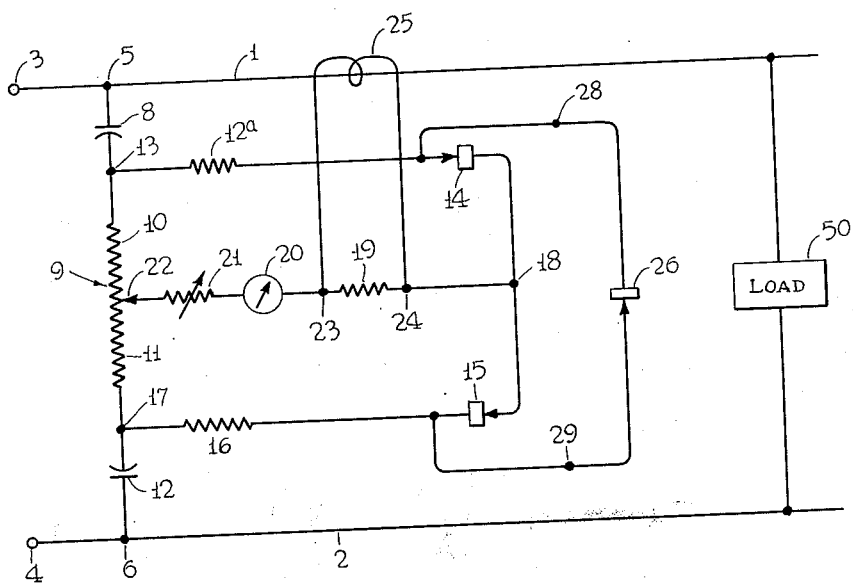
INVENTOR
Alan Warnick,
BY *Donald B White*
ATTORNEY Patented July 15, 1947

2,424,131

UNITED STATES PATENT OFFICE 2,424,131

REACTIVE CURRENT INDICATOR

Alan Warnick, Detroit, Mich., assignor, by mesne assignments, to The Budd Company, Philadelphia, Pa., a corporation of Pennsylvania Application February 4, 1946, Serial No. 645,448

6 Claims. (Cl. 172—245)

This invention relates to electrical apparatus for indicating the phase relationships in a load circuit. More particularly, the invention pertains to a means for indicating the reactive current in a load circuit adapted particularly to include an induction heater.

In an induction heater it is desirable that the reactive current be approximately zero in order to insure operation of the heater at highest efficiency. To this end a reactive current meter is desirable since it will facilitate adjustment of the capacitor load so as to secure the desired power factor values.

It is, therefore, an object of the present invention to provide a reactive current indicator which will indicate the power factor accurately by measuring reactive amperes. A further object of the invention is to provide an indicator which is simple in construction and utilizes a circuit readily applied to the load circuit, the reactive current of which is to be determined. An additional object of the invention is to provide a reactive current indicator which through its circuit elements permits the elimination of the potential transformer. An object also is to provide a reactive current indicator circuit which is operable with accuracy over a wide frequency range of the load circuit. Other objects of the invention will appear on consideration of the following description of the invention taken in connection with the figure of the drawing, showing diagrammatically the circuit arrangement of meter and wiring network.

In the figure, main load conductors 1 and 2 connect to terminals 3 and 4 of an alternating current source. This source may be of varied frequency depending upon the requirements of the load. The numeral 50 indicates a load which may be of any type, but for the particular uses of the phase indicator it is usually an inductive load, such as the heating coil of an induction heater. Connected across the conductors of the main circuit between points 5 and 6 is a network including a capacitor 8, the resistor 9 having branches 10 and 11, and the capacitor 12. The resistor 9 is two arms of a bridge network which also includes resistor 12a connected at point 13 between resistor 9 and capacitor 8 and leading through rectifiers 14 and 15 and resistor 16 to point 17 between resistor 9 and capacitor 12. The rectifiers 14 and 15 are in series as shown in the drawing.

Intermediate the rectifiers at point 18 a bridge conductor leads through a transformer shunt resistor 19, a direct current ammeter 20, and a variable resistor 21 to a contact slider 22 bearing on the voltage divider shunt 9 and dividing the same into two sections 10 and 11 subject to change in the resistance value according to the position of the slider 22.

Points 23 and 24 at the terminals of the shunt resistor 19 connect to the secondary 25 of a current transformer inductively related to the main conductor 1 of the load circuit.

In addition to the rectifiers 14 and 15 mentioned is a third rectifier 26 which is connected in parallel with the rectifiers 14 and 15. Each of these rectifiers may be of any type, such as electronic or metallic. The polarity of the rectifier 26 is in opposition to the rectifiers 14 or 15, as shown in the drawing.

The power factor indicator as above described thus includes a bridge network formed of the resistors 10 and 11 in series and the rectifiers 14 and 15 in series, with the bridge including the direct current meter 20 and the power supplied the bridge being led from the load circuit being tested through capacitors 8 and 12.

In the operation of the circuit it will appear that points 18 and 22 of the alternating current bridge do not develop voltages when power is applied at source points 3 and 4 when the bridge balance is obtained by adjustment of slider 22, and that without the application of the current transformer voltage the direct current meter 20 will not register other than zero due to the equivalence of the alternating voltages. In order to establish a voltage with phase difference between the points 18 and 22 of the bridge, there is applied a voltage variable with load current by means of the current transformer 25 which is superimposed on the bridge voltage as derived from source voltage. The phase angle between these voltages will depend upon the power factor of the circuit. Where the angle between the bridge imposed voltage and the source voltage is 90°, there will be zero deflection at the meter. At 0° phase difference the deflection will be maximum, that is, it will correspond to the voltage impressed by the current transformer. For phase angles intermediate 0° and 90° the magnitude of the deflection will be intermediate zero and the maximum values.

As mentioned hereinabove and without the phase change introduced by the circuit 8, 9, 12, the zero on the meter indicates maximum value of phase difference as between the voltage due to the transformer 25 and that due to the load voltage. Accordingly, in reading the meter it will be necessary to have it indicate positive maximum at 0° deflection, zero at 90° deflection, and a maximum in reverse at 180° deflection, it being assumed that the scale is calibrated in reactive amperes. This method of reading is not as satisfactory as a means which provides a zero point at the middle of the scale with deflections to the left or right of the zero point according to whether the power factor indicates a lag or a lead in the phase angle. To secure a meter dial and indication of this type is the purpose of the capacitors 8 and 12 in the voltage divider circuit. Each capacitor, as 8, in conjunction with its adjacent resistor 10, develops an impedance in which the magnitude of the reactance of the capacitor 8 is highly in excess of the resistance of the resistor 10. Accordingly, the unit will produce an angle of lead approximating very closely 90°. Assuming the values for elements 8 and 10 being equivalent to the elements 11 and 12 and a one-thousand voltage across the mains of the circuit, the drop across the capacitors 8 and 12 would be, for example, 497½ volts, thus developing a voltage of five volts between the points 13 and 17. With these relationships the phase angle would be approximately 90° and hence the zero point would be properly shifted to the mid-point of the meter, permitting indications of lead and lag to either side of the zero point.

While the circuit as described to this point is satisfactory in wide uses, there are certain points of refinement which are advantageous and which may now be described. It has been found that a direct current may develop between the points of 13 and 17 and cause a wave form distortion of the applied line voltage across these points. By connecting the third rectifier 26 in shunt with the rectifiers 14 and 15, reversed in polarity, this distortion is completely eliminated. However, for some uses this corrective rectifier is not essential and may be omitted by opening the circuit at points marked 28 and 29. Also, it has been found desirable to insert in the rectifier branches resistors 12a and 16 which function to limit the current through the rectifiers to a rated value and also to make the circuit dependent upon the value of the resistors and independent to a degree of changes in rectifier resistance. Also, a variable resistor 21 is included in the bridge circuit in order to permit easy calibration of the meter. The resistor 9 described has two sections 10 to 11, and as shown these sections connect directly to each other in a continuous unit which is made adjustable by means of the slider 22. This arrangement is not always necessary, as in some uses the values of the resistors 10 and 11 may be fixed and these elements separated with a fixed connection.

The reactive current indicator as described above is simple in the constituent parts entering into the combination, and the equipment necessary is also simple and of relatively low cost, such as the direct current ammeter and the rectifier units. It is pointed out further that in equivalent circuits without the particular meter and rectifier bridge as employed, it has been usually found necessary heretofore to employ a potential transformer, thus increasing the cost of the equipment. The circuit gives greater efficiency by reducing the reacting current in the circuit and therefore lowers the I²R losses. Also, the circuit permits better utilization of current capacity of the generator and cables and operates efficiently over a substantial range of frequencies.

Modifications of the invention obviously may be made, the essential details and combination being incorporated in the claims as hereto appended.

What is claimed is:

1. A reactive current indicator comprising a series network having two series resistors and two series rectifiers, a bridge formed by the connection across said series network at the junction points between said rectifiers and between said resistors, a meter connected in said bridge, a resistor connected in said bridge, a capacitor connected to the junction point of each series resistor and rectifier, two main line conductors adapted to receive a load connected respectively to said capacitors, and a current transformer directly connected in shunt with said bridge resistor and inductively connected to one of the main line conductors.

2. A reactive current indicator comprising a series network having two series resistors and two series rectifiers, a bridge formed by the connection across said series network at the junction points between said rectifiers and between said resistors, a meter connected in said bridge, a resistor connected in said bridge, a capacitor connected to the junction point of each series resistor and rectifier, two main line conductors adapted to receive a load connected respectively to said capacitors, a current transformer directly connected in shunt with said bridge resistor and inductively connected to one of the main line conductors, and a third rectifier connected in parallel with said series rectifiers.

3. A reactive current indicator comprising a series network having two series resistors and two series rectifiers, a resistor connected in the series network between each rectifier and the adjacent series resistor, a bridge formed by the connection across said series network at the junction points between said rectifiers and between said series resistors, a meter connected in said bridge, a resistor connected in said bridge, a capacitor connected to the junction point of each series resistor and rectifier, two main line conductors adapted to receive a load connected respectively to said capacitors, and a current transformer directly connected in shunt with said bridge resistor and inductively connected to one of the main line conductors, the junction point between the series network resistors being adjustable.

4. A reactive current indicator for a load circuit having an alternating current power source comprising main conductors between source and load, a combined voltage divider and phase shift connected to the main conductors across the load circuit and including two capacitor-resistor units connected in reversed series, two rectifiers connected in series to junction points between the capacitor and resistor of each capacitor-resistor unit, a bridge circuit formed at the junction points of said rectifiers and of said resistors, a meter in said bridge circuit, and means for superimposing a voltage corresponding to the main conductor current on said bridge circuit.

5. A reactive current indicator for a load circuit having an alternating current power source comprising a network of two resistor units and two rectifier units connected in series, a bridge circuit formed by the connection across said network between junction points of the rectifier units and of the resistors, a meter in said bridge circuit, means for imposing a voltage corresponding to the main conductor current on said meter, and means for shifting the phase of the bridge voltage approximately 90°.

6. A reactive current indicator for a load circuit having an alternating current power source comprising a network of two resistor units and two rectifier units connected in series, a bridge circuit formed by the connection across said network between junction points of the rectifier units and of the resistors, a meter in said bridge, means for imposing the main conductor voltage on said meter, and means for shifting the phase of the bridge voltage approximately 90°, said phase shift means comprising a capacitor connected between each of said network resistors and the main conductors, the reactance of the capacitors being large relative to the resistance of the resistors.

ALAN WARNICK.